United States Patent [19]

Shyu et al.

[11] Patent Number: 5,486,868
[45] Date of Patent: Jan. 23, 1996

[54] GENERATOR FOR SCAN TIMING OF MULTIPLE INDUSTRIAL STANDARDS

[75] Inventors: Rong-Fuh Shyu; Wen-I Chu, both of Hsinchu, Taiwan

[73] Assignee: Winbond Electronics Corporation, Hsinchu, Taiwan

[21] Appl. No.: 445,336

[22] Filed: May 19, 1995

[51] Int. Cl.⁶ .............................. H04N 5/06; H04N 5/04
[52] U.S. Cl. .................. 348/524; 348/542; 348/550; 348/521
[58] Field of Search .................... 348/524, 523, 348/522, 521, 530, 529, 531, 537, 536, 540, 542–548, 549, 541, 500, 510, 516, 550, 555, 554, 558, 443, 458, 441; 345/213, 132, 115, 116; 327/291, 295; H04N 5/06, 5/067, 5/04

[56] References Cited

U.S. PATENT DOCUMENTS 4,169,659  10/1979  Marlowe .................. 348/524
4,328,513   5/1982  Furihato et al. ........... 348/521
4,518,995   5/1985  Harshbarger et al. ...... 348/521
4,958,227   9/1990  Wan ......................... 348/523
5,124,804   6/1992  Socarras .................... 348/524
5,241,281   8/1993  Wilkes et al. ............. 345/213

*Primary Examiner*—Safet Metjahic
*Attorney, Agent, or Firm*—Fish & Richardson

[57] ABSTRACT

The invention inputs a single timing clock. Through procedure of mode setting, the invention generates the required timings corresponding to the display mode selected. In the invention, a programmable mode register, a mode decoder, a pixel timing generator, a horizontal timing generator, a vertical timing generator, a composite timing generator, AND gate, EXCLUSIVE NOR gate, and a selector are provided. The invention may generate the required timings for NTSC interlace mode, NTSC non-interlace mode, PAL interlace mode, PAL non-interlace mode, VGA 60 Hz progressive mode and VGA 50 Hz progressive mode.

9 Claims, 5 Drawing Sheets

BLOCK DIAGRAM

BLOCK DIAGRAM

| REGISTER | MODE | PIXEL CLOCK | H_SYNC | V_SYNC | SCAN LINES PER VERTICAL PERIOD |
|---|---|---|---|---|---|
| 000 | NTSC INTERFACE | 13.5MHz | 15734Hz | 59.94Hz | 262.5 |
| 001 | NTSC NON-INTERLACE | 13.5MHz | 15734Hz | 59.83Hz | 263 |
| 010 | PAL INTERLACE | 13.5MHz | 15625Hz | 50Hz | 312.5 |
| 011 | PAL NON-INTERLACE | 13.5MHz | 15625Hz | 49.92Hz | 313 |
| 10x | VGA PROGRESSIVE 60Hz | 27MHz | 31468Hz | 59.9Hz | 525 |
| 11x | VGA PROGRESSIVE 50Hz | 27MHz | 31250Hz | 50Hz | 625 |

FIG. 2 VIDEO SCAN MODES

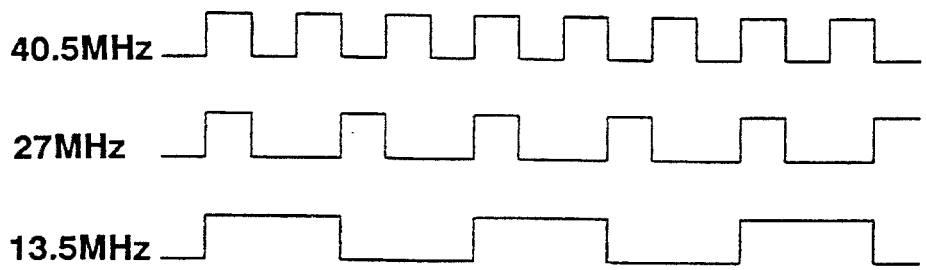
FIG. 3 PIXEL CLOCK TIMING
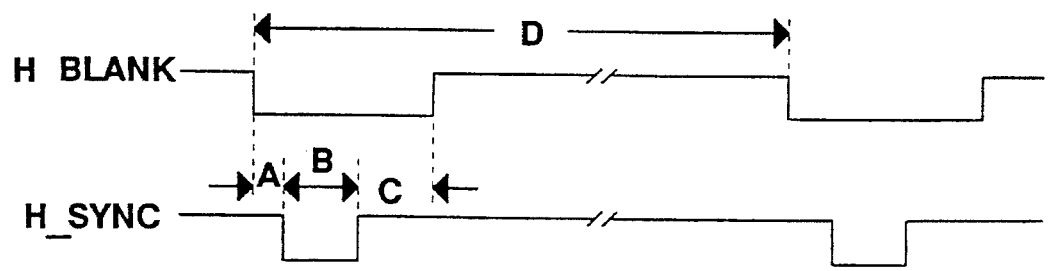
| MODE | A | B | C | D |
|---|---|---|---|---|
| NTSC | 20 PIXEL CLOCKS | 64 PIXEL CLOCKS | 64 PIXEL CLOCKS | 858 PIXEL CLOCKS |
| PAL | 20 PIXEL CLOCKS | 64 PIXEL CLOCKS | 76 PIXEL CLOCKS | 864 PIXEL CLOCKS |
| VGA/60Hz | 22 PIXEL CLOCKS | 102 PIXEL CLOCKS | 48 PIXEL CLOCKS | 858 PIXEL CLOCKS |
| VGA/50Hz | 22 PIXEL CLOCKS | 102 PIXEL CLOCKS | 48 PIXEL CLOCKS | 864 PIXEL CLOCKS |
FIG. 4 HORIZONTAL TIMING

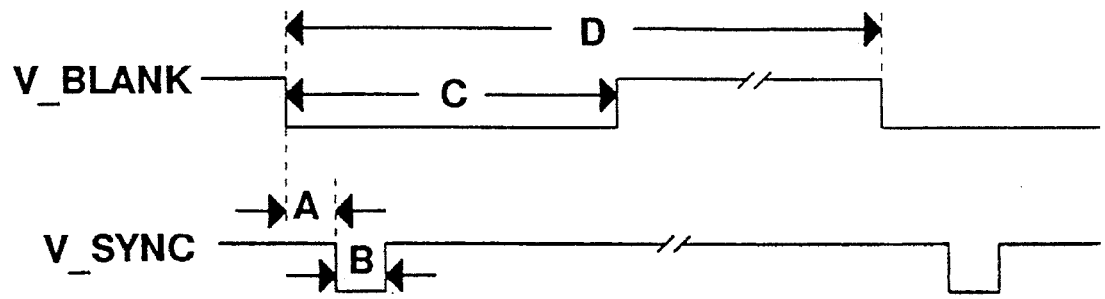
| MODE | A | B | C | D |
|---|---|---|---|---|
| NTSC/ INTERLACE | 3 LINES | 3 LINES | 21 LINES | 262.5 LINES |
| NTSC/ NON-INTERLACE | 3 LINES | 3 LINES | 21 LINES | 263 LINES |
| PAL/ INTERLACE | 2.5 LINES | 2.5 LINES | 25 LINES | 312.5 LINES |
| PAL/ NON-INTERLACE | 2.5 LINES | 2.5 LINES | 25 LINES | 313 LINES |
| VGA/ 60Hz | 10 LINES | 2 LINES | 45 LINES | 525 LINES |
| VGA/ 50 Hz | 10 LINES | 2 LINES | 45 LINES | 625 LINES |
FIG. 5 VERTICAL TIMING
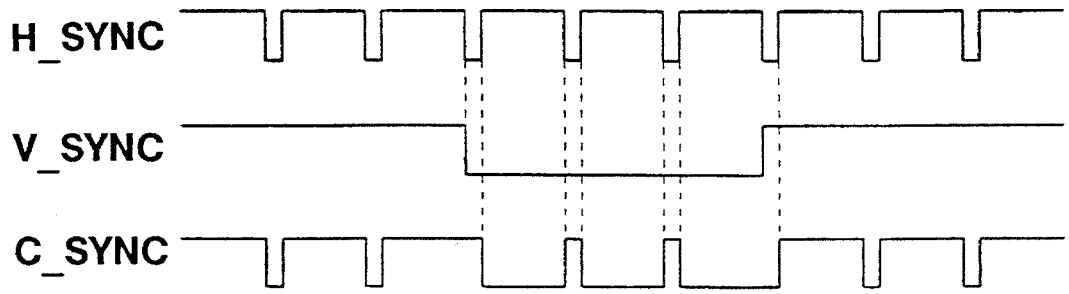
COMPOSITE SYNC. TIMING FOR
TV/NTSC/NON-INTERLACE MODE
FIG. 6

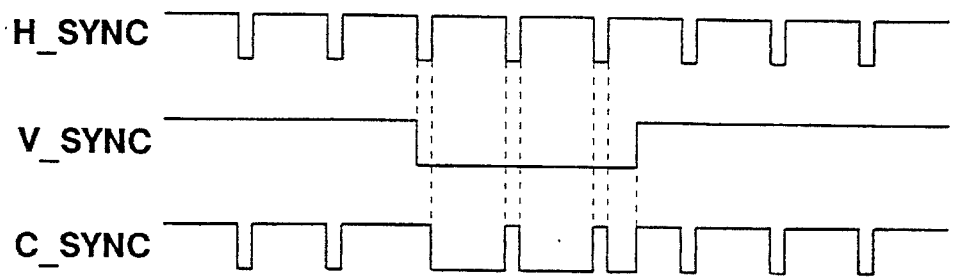
FIG. 7 COMPOSITE SYNC. TIMING FOR TV/PAL/NON-INTERLACE MODE
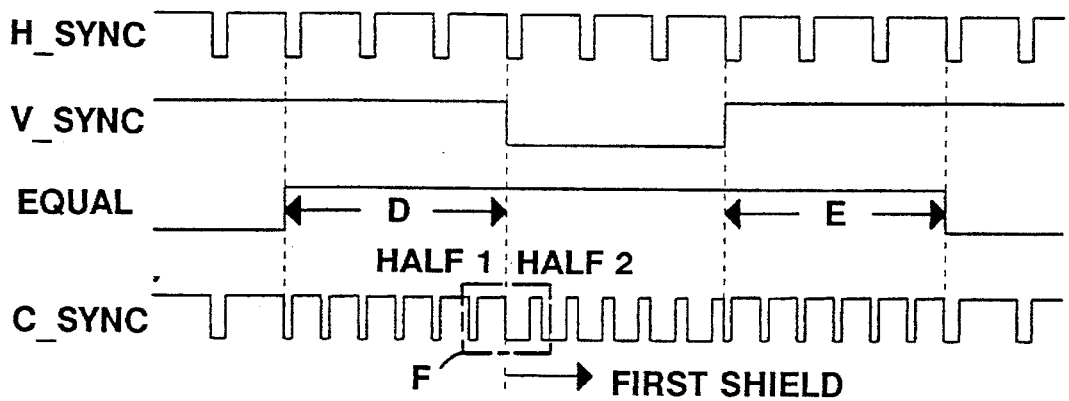
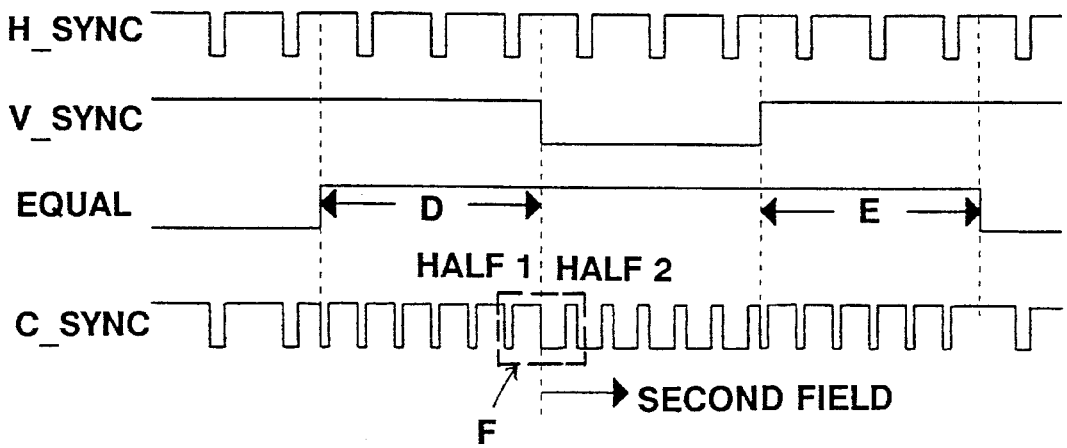
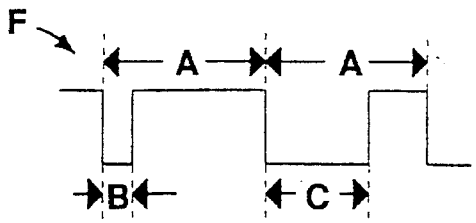
| A | 429 PIXEL CLOCKS |
| B | 32 PIXEL CLOCKS |
| C | 365 PIXEL CLOCKS |
| D | 3 LINES |
| E | 3 LINES |
FIG. 8 COMPOSITE SYNC. TIMING FOR TV/NTSC/INTERLACE MODE

COMPOSITE SYNC. TIMING FOR TV/PAL/INTERLACE MODE

GENERATOR FOR SCAN TIMING OF MULTIPLE INDUSTRIAL STANDARDS

TECHNICAL FIELD OF INVENTION

The invention relates to scan timing generator which generates scan timing of multiple industrial standards.

BACKGROUND OF INVENTION

There exist several industrial standards in the fields of video display system. Each video display standard has it own display timing which is different from those of other standards. Among others, the NTSC, PAL display mode of TV system and the VGA progressive display mode of Personal Computer system are well known and commonly employed in the industry.

The following table is the summary of the scan parameters of the mentioned video display standards.

|  | NTSC | PAL | VGA |
|---|---|---|---|
| Horizontal frequency | 15734 Hz | 15625 Hz | 31.5 KHz |
| vertical frequency | 59.94 Hz | 50 Hz | 60 Hz |
| scan line | 525 | 625 | / |
| resolution | / | / | 640*480 |
| scan mode | interlace | interlace | progressive |

In the field of multi-media application, the operation of output and display of the digital images require scan timing signals, which follow multiple industrial standards, and, accordingly, the multi-media information may be displayed as required in accordance with the standard selected.

In order to display the information in accordance with multiple widely used industrial standards, the instant invention provides a timing generator which is capable of outputing scan timing of various industrial standards.

The purpose and utilization of the horizontal, vertical and composite timing signals, etc. mentioned hereinafter are all well known in this field and further elaboration is deem unnecessary for persons skilled in the arts.

SUMMARY OF THE INVENTION

A video scan timing generator is provided to generate scan timings of multiple industrial standards. The generator comprises a programmable mode register for storing and outputing a mode value which corresponds to a predetermined mode operation. A mode decoder, adapted to receive the mode value, is provided for outputing a mode control signal. A first timing generator, adapted to receive the mode control signal and the single timing clock, is provided to generate a pixel clock corresponding to the predetermined mode operation. A second timing generator, adapted to receive the pixel clock and the mode control signal, is provided to generate a horizontal synchronization signal and a horizontal blanking signal corresponding to the predetermined mode operation. A third timing generator, adapted to receive the pixel clock, a pixel_count value and the mode control signal, is provided to generate a vertical synchronization signal, a vertical blanking signal and a top_field signal corresponding to the predetermined mode operation. A fourth timing generator, adapted to receive the pixel clock, the pixel_count value, a horizontal_count value, the horizontal synchronization signal, the vertical synchronization signal and the mode control signal, selectively generates an interlace composite synchronization signal. An AND gate, adapted to receive the horizontal and the vertical blanking signal, is provided to generate a composite blanking signal. An EXCLUSIVE NOR gate, adapted to perform EXCLUSIVE NOR operation to the horizontal synchronization signal and the vertical synchronization signal, generates a non-interlaced composite synchronization signal. A selector, in response to the mode control signal, is provided to selectively output the non-interlace composite synchronization signal and the interlace composite synchronization signal.

BRIEF DESCRIPTION OF THE APPENDED DRAWINGS

FIG. 2 shows scan parameters corresponding to different display mode most frequently used in the industry.

FIG. 3 shows the input and output signals of the pixel clock generator 13 in FIG. 1.

FIG. 4 shows the timing of the output signals of the horizontal timing generator 14 in FIG. 1.

FIG. 5 shows the timing of the output signals of the vertical timing generator 15 in FIG. 1.

FIG. 6 shows the timing of the composite synchronization signal with respect to two input signals for TV/NTSC/non-interlace display mode.

FIG. 7 shows the timing of the composite synchronization signal with respect to two input signals for TV/PAL/non-interlace display mode.

FIG. 8 shows the timing of the composite synchronization signal with respect to two input signals for TV/NTSC/interlace display mode.

DETAILED DESCRIPTION OF THE PREFERRED EMBODIMENT

Figure 1:
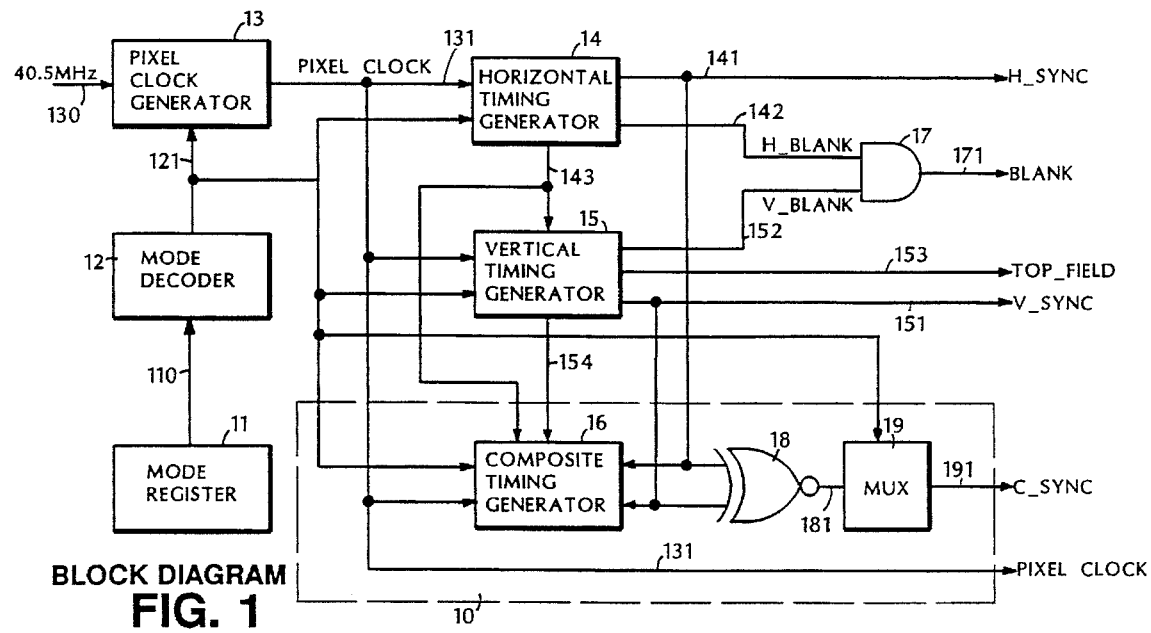
FIG. 1 shows the invention in functional blocks.

As shown in FIG. 1, the invention comprises a programmable mode register 11, a mode decoder 12, a pixel timing generator 13, a horizontal timing generator 14, a vertical timing generator 15, a composite timing device 10, AND gate 17. The composite timing device 10 includes composite timing generator 16, XNOR gate 18 and selector 19.

The mode register 11 is a three-bit register into which a value is programmed by an external controller in order to set up the system display mode for the invention. The invention has six system display modes for selection as shown in FIG. 2.

The mode decoder 12 is adapted to receive the output 110 from the mode register 11 and, responsive the value on the signal line 110, outputs the mode control signal 121 informing other functional blocks of the invention of the display mode selected. Base on this mode control signal 121, the associated circuits together generate the required timings of the selected display mode.

The pixel timing generator 13 inputs a single timing clock 130 having frequency of 40.5 MHz and, based on the mode control signal 121, generates pixel clock signal 131 having frequency of 27 MHz and 13.5 MHz respectively for personal computer VGA display mode and TV display mode, as shown in FIG. 3. The internal structure and detailed circuit design of this functional block may be readily accomplished by persons skilled in the arts and will not be elaborated further herein. The pixel clock signal 131 is input to the horizontal, vertical and composite timing generator 14, 15, 16 as the signal triggering the operations thereof.

The horizontal timing generator 14 includes at least a 10-bit counter, which is clocked by the pixel clock signal 131, and associated circuits. The current value of the counter mentioned indicates which pixel on a specified horizontal scan line is being scan. When a system reset signal is input or display mode changes indicated by the mode control signal 121, this 10-bit counter is preset a predetermined value. For instance, as display mode is PAL or VGA 50 Hz, this predetermined value is 863; as display mode is NTSC or VGA 60 Hz, this predetermined value is 857. Therefore, under PAL or VGA 50 Hz mode, one single horizontal scan line consists of 864 pixel clocks, and under NTSC or VGA 60 Hz mode, one single horizontal scan line consists of 858 pixel clocks. When, responsive to the pixel clock signal 131, the 10-bit counter decrements to zero indicating one entire horizontal scan line has been completed, the predetermined value is loaded again. The timing of the horizontal synchronization signal 141 and blanking signal 142 from the horizontal timing generator 14 are shown in FIG. 4 for four different display modes. In FIG. 4, A represents front porch, B represents horizontal synchronization pulse, D represents one entire horizontal scan line and C represents back porch. The internal structure and detailed circuit design of this functional block may be readily accomplished by persons skilled in the arts and will not be elaborated further herein.

The vertical timing generator 15 inputs the pixel clock signal 131 as the trigger signal of the operation and refers to the current counter value signal 143 for generating a vertical synchronization signal 151, a vertical blanking signal 152 and a top_field signal 153 corresponding to the predetermined mode operation. The top_field signal 153 is used as indication signal for the first field or second field of the scan as the operation mode is an interlace display mode. The vertical timing generator 15 includes a 10-bit counter and associated circuits. The current value of the counter mentioned indicates which horizontal line is being scan. As the system reset signal is enabled or the change of display mode occurs, this counter is cleared to zero. Each time one entire horizontal line has been scanned, the counter automatically increments by one. This counter is operated as one with a predetermined modulo in accordance with a corresponding display mode. For instance, for NTSC interlace or VGA 60 Hz display mode, this counter is operated as one with modulo-524, and each time the counter reaches 524, the counter automatically resets to zero. For PAL interlace or VGA 50 Hz display mode, this counter is operated as one with modulo-624, and each time the counter reaches 624, the counter automatically resets to zero. For NTSC non-interlace display mode, this counter is operated as one with modulo-262, and each time the counter reaches 262, the counter automatically resets to zero. For PAL non-interlace display mode, this counter is operated as one with modulo-312, and each time the counter reaches 312, the counter automatically resets to zero. The current counter value appears on lead 154. The timings of vertical blanking signal 152, the vertical synchronization signal 151 are shown in FIG. 5 for six different display modes. Only under the interlace display mode, the top_field signal 153 is effective to other circuits in the invention. Under NTSC interlace display mode, the first field (top_field=1) includes scan lines which starts from the first horizontal scan line to the mid point of the 263rd horizontal scan line, and, the second field (top_field=0) includes scan lines which starts from the mid point of the 263rd horizontal scan line to the end of the 525th horizontal scan line. Under PAL interlace display mode, the first field (top_field=1) includes scan lines which starts from the first horizontal scan line to the mid point of the 313rd horizontal scan line, and, the second field (top_field=0) includes scan lines which starts from the mid point of the 313rd horizontal scan line to the end of the 625th horizontal scan line. The internal structure and detailed circuit design of this functional block may be readily accomplished by persons skilled in the arts and will not be elaborated further herein.

The composite timing generator 16, including a 9-bit counter and associated circuits, is disabled under the VGA display mode. Under the TV four display modes, the composite timing device 10 is operated in the following manner.
(1) non-interlace display mode Under the TV non-interlace display mode, the selector 19, responsive the mode control signal 121, outputs the signal 181 from EXCLUSIVE NOR gate 18 to the composite synchronization signal line 191. The EXCLUSIVE NOR gate 18 performs XNOR operation on the input horizontal synchronization signal 141 and vertical synchronization signal 151, and generates the XNOR output signal 181.

The shown EXCLUSIVE NOR gate 18 is used to effectuate the generation of the non-interlace composite synchronization signal 181. As shown in FIG. 6 and 7, as vertical synchronization signal 151 is logic high, the non-interlace composite synchronization signal 181 has same shape as the horizontal synchronization signal 141, and, as the vertical synchronization signal 151 is logic low, the non-interlace composite synchronization signal 181 is inverted as compared with the horizontal synchronization signal 141.
(2) interlace display mode Under the TV interlace display mode, the selector 19, responsive the mode control signal 121, outputs the interlace composite synchronization signal 161 of the composite timing generator 16 to the composite synchronization signal line 191.

Figure 9:
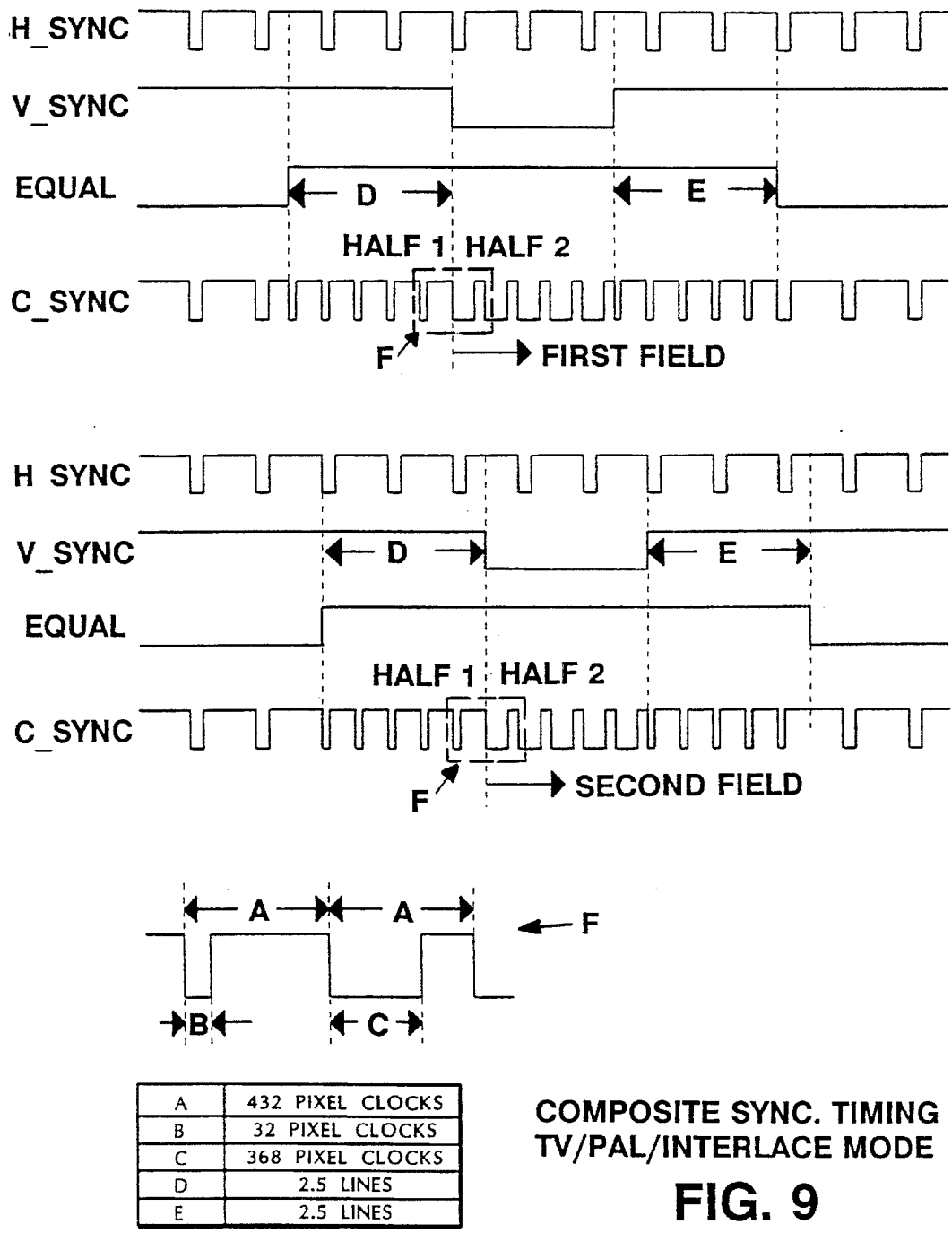
FIG. 9 shows the timing of the composite synchronization signal with respect to two input signals for TV/PAL/interlace display mode.

Under the NTSC interlace display mode, each field consists of 262.5 horizontal scan lines, and under the PAL interlace display mode, each field consists of 312.5 horizontal scan lines. Based on the standard format of the specification of TV timing, the internal circuit of the composite timing generator 16 generates an equalization (Equal) signal therein which is active for 9 entire horizontal scan lines for NTSC mode and 7.5 horizontal scan lines for PAL mode respectively as required by the associated specifications and shown in FIG. 8 and 9. The Equal signal is generated based on the counter value 143 of the horizontal timing generator 14 and the counter value 154 of the vertical timing generator 15. It is well known the information of the counter value 143 and 154 together determine the location of a pixel location being scan. As the internal equalization signal is logic low, the interlace composite synchronization signal 161 has same shape as horizontal synchronization signal 141, and, as the internal equalization signal is logic high, the time interval of each entire horizontal scan line is divided into two intervals each of which represents half of a horizontal scan line. The 9-bit counter generates a Half1 signal, when vertical synchronization signal 151 is logic high, and a Half2 signal, when vertical synchronization signal 151 is logic low, as shown in FIG. 8 or 9, which identifies the corresponding half-interval of the horizontal scan line. As the internal equalization signal is active and the vertical synchronization signal 151 is logic high, the Half1 signal is output as the interlace composite synchronization signal 161. As the internal equalization signal is active and the vertical synchronization signal 151 is logic low, the Half2 signal is output as the interlace composite synchronization signal 161. Therefore, during the period of equalization signal being active, the interlace composite synchronization signal 161 changes form in response to any change of the vertical synchronization signal 151. Based on the above elaboration, the internal structure and detailed circuit design of this functional block may be readily accomplished by persons skilled in the arts and will not be elaborated further herein.

The AND gate 17 performs AND operation to the horizontal blanking signal 142 and vertical blanking signal 152 to generates the composite blanking signal 171.

We claim:

1. A video scan timing generator, the video scan timing generator inputting a single timing clock, comprising:

a programmable mode register for storing and outputting a mode value which corresponds to a predetermined mode operation;

a mode decoder, adapted to receive the mode value, for outputting a mode control signal;

a first timing generator, adapted to receive the mode control signal and the single timing clock, for generating a pixel clock corresponding to the predetermined mode operation;

a second timing generator, adapted to receive the pixel clock and the mode control signal, for generating a horizontal synchronization signal and a horizontal blanking signal corresponding to the predetermined mode operation, the second timing generator including a first counter outputting a pixel_count value;

a third timing generator, adapted to receive the pixel clock, the pixel_count value and the mode control signal, for generating a vertical synchronization signal, a vertical blanking signal and a top_field signal corresponding to the predetermined mode operation, the third timing generator including a second counter outputing a horizontal_count value;

a fourth timing generator, adapted to receive the pixel clock, the pixel_count value, the horizontal_count value, the horizontal synchronization signal, the vertical synchronization signal and the mode control signal, for selectively generating an interlace composite synchronization signal;

AND gate, adapted to receive the horizontal and the vertical blanking signal, for generating a composite blanking signal;

EXCLUSIVE NOR gate, adapted to perform EXCLUSIVE NOR operation to the horizontal synchronization signal and the vertical synchronization signal, for generating a non-interlaced composite synchronization signal;

a selector, in response to the mode control signal, for selectively outputting the non-interlace composite synchronization signal and the interlace composite synchronization signal.

2. The timing generator as recited in claim 1, wherein the mode register comprises a first bit discriminating a TV scan operation from a personal computer VGA scan operation.

3. The timing generator as recited in claim 2, wherein the mode register comprises a second bit, and as the first bit indicates the TV scan operation, the second bit discriminates a NTSC scan operation from a PAL scan operation.

4. The timing generator as recited in claim 2, wherein the mode register comprises a second bit, as the first bit indicates the personal computer VGA scan operation, the second bit discriminates a 60 Hz vertical refresh operation from a 50 Hz vertical refresh operation.

5. The timing generator as recited in claim 2, wherein the mode register comprises a third bit, and as the first bit indicates the TV scan operation, the third bit discriminates an interlace scan operation from a non-interlace scan operation.

6. The timing generator as recited in claim 2, wherein the mode register comprises a third bit, as the first bit indicates the personal computer VGA scan operation, the third bit represents don't care.

7. The timing generator as recited in claim 1, wherein the single timing clock has frequency of 40.5 MHz.

8. The timing generator as recited in claim 1, as the predetermined mode operation is a TV scan operation, the generated pixel clock has frequency of 13.5 MHz.

9. The timing generator as recited in claim 1, as the predetermined mode operation is a personal computer VGA scan operation, the generated pixel clock has frequency of 27 MHz.

* * * * *